Nov. 23, 1948.                    O. JACOBSEN                    2,454,389
                                   PLUG VALVE
                              Filed July 8, 1944
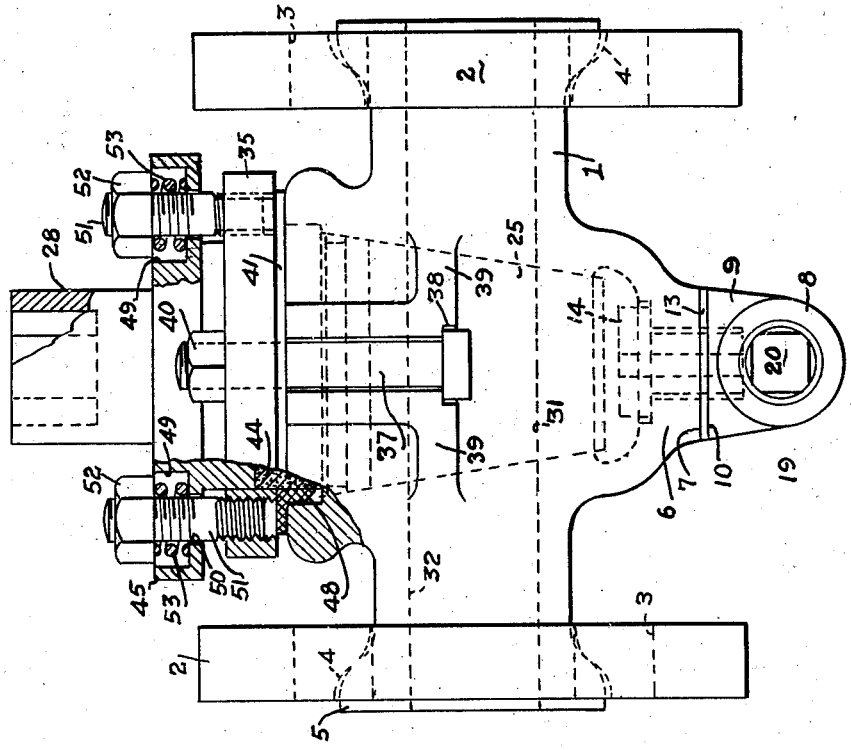
INVENTOR
BY OYSTEIN JACOBSEN,
Toulmin & Toulmin,
ATTORNEYS Patented Nov. 23, 1948

2,454,389

UNITED STATES PATENT OFFICE 2,454,389

PLUG VALVE

Oystein Jacobsen, Montgomery County, Ohio, assignor to The Duriron Company, Inc., Dayton, Ohio, a corporation of New York Application July 8, 1944, Serial No. 543,994

4 Claims. (Cl. 251—103)

The present invention relates to valves for controlling the flow of liquids and more particularly to those valves of the plug-cock type.

Valves of this type are quite often employed for controlling liquids or gases under tremendous pressures so that the matter of leakage at any one of the various joints between the parts of the valve is important. This is particularly true in case the valve is handling corrosive liquids such as acid solutions because this leakage represents not only a loss of the liquid in passing through the valve but also promotes attack on those parts of the valve which have not been especially designed to stand such attacks. A prolific source of leakage usually exists around the valve stem in the neighborhood of the cover and in order to meet this problem, packing material is usually employed to which pressure is applied by a gland member. The packing material usually comprises one or more rings of a size snugly to fit within the annular space directly surrounding the valve stem and contained within an annular space in the cover plate. This arrangement works satisfactorily on most occasions, but in time the packing tends to deteriorate due to becoming dry or to the continuous pressure effects of the gland so that it becomes necessary to either renew the packing material or else to suffer a certain amount of leakage at this point.

The primary object of the invention is to provide an improved leak-preventing structure fitted about the plug-stem and one which provides its own lubrication with little or no wear and therefore has an exceedingly long life. A further object is to provide an improved valve structure as a whole in which leakage about the plug stem is prevented by an improved form of seal which lends facility of assembly to the valve structure and is made of a non-flexible self-lubricating material which permits pressure of a predetermined amount to be applied to the upper portion of the plug stem without undue friction.

The above objects are attained in brief by employing for the seal member a ring of graphite which is inserted into the annular space between the plug stem and the cover plate and supplementing the sealing effects of the ring by a heavy washer made of an acid-resisting flexible material such as synthetic rubber. The invention will be better understood when reference is made to the following description and the accompanying drawings in which:

Figure 1 represents a vertical sectional view of the improved valve but with the plug and stem in elevation for clearness.

Figure 2 is a side elevation of the valve with parts broken away to show their inner construction.

In the drawings, reference numeral 1 designates the body of a valve which terminates at each end in a flange coupling 2 provided with openings 3 for receiving bolts by which the flanges 2 are secured to corresponding flanges of the connecting conduits. In practice the flanges 2 may be made separate from the valve body and provided with tapered openings indicated in 4 which clamp about the outwardly extending necks of the valve body.

The body 1 is provided with an integrally joined extension 6 of circular configuration which terminates in a flat surface 7 for receiving a horizontally extending cylindrical member 8, the purpose of which will be explained presently. This member, preferably of cylindrical configuration is shown in Figure 2 and is provided at its middle portion with an upstanding extension 9 which terminates in a flat surface 10 directly opposite the surface 7 on the valve body. The cylindrical member 8 is provided with a threaded opening 11 approximately midway of its length passing through the portion 9 for receiving a relatively large screw member 12 which terminates at the top in a cap 14. This cap sets on a recess 15 counterbored into the inner surface of the extension 6 as shown and the latter is provided with an opening 16 somewhat larger than the shank of the screw. A washer 13 of synthetic rubber or any other acid-resisting resilient material may be interposed between the surface 7 and the flat surface 10 of the cylinder 8. An opening 16' is provided longitudinally of the cap screw 12. The cylinder 8 is bored from the right as indicated at 18 to a distance measured from the right of the cylinder as will extend to the far side of the screw 12. The bore 18 terminates at the open end in a larger opening 19 which is threaded to receive a screw plug 20. The left hand end of the cylinder 8 is also provided with a threaded opening 21 of a slightly smaller size than the opening 18 in order to receive a cap screw 22. This screw enters the cylinder for a considerable distance along the bore 18.

The valve body 1 at its upper end is provided with a counterbored recess 23. The general shape of the body is conical in order to provide a conical seat indicated at 24 for a tapered plug 25. A small chamber 26 is provided by extending the lower end of the body 1 beyond the bottom of the plug in order to receive the cap 14 of the screw 12. The plug 25 extends upwardly beyond the valve body in the form of a pair of stems 27 and 28 respectively to provide shoulders 29 and 30. The seating portion of the plug 25 is provided with a transverse opening 31 which is adapted to be moved into or out of alignment with the opening 32 in the valve body through which the liquid or fluid flows that is being controlled.

In order to lubricate this seating surface a pair of oppositely disposed longitudinal grooves 33 may be provided and these grooves communicate with each other through a circumferential groove 34 positioned near the top of the plug.

In practice, the fluid passing through and controlled by the valve usually has considerable pressure tending to lift the plug and to leak past the valve seat. Moreover, when lubrication is introduced into the chamber 18 and is subjected to pressure by the screw 22, the lubricant which collects in the recess or compartment 26 flows through the various grooves 33 and also tends to lift the plug from its seat to cause leakage. It is therefor apparent that the problem of suitably holding the plug down against the seat is difficult to solve and in general, the higher the pressure of the fluid being controlled, the more difficult the problem. The present invention is directed to a satisfactory correction of this condition.

A cover plate 25 is first provided, this plate preferably taking a rectangular configuration and has a pair of oppositely disposed openings 36 for loosely receiving a bolt 37. The head or lower end of each bolt is set within a countersunk recess 38 and spans a pair of brackets 39 preferably cast into the body 1 at each side thereof. By tightening the nuts 40 on these bolts, the cover plate is caused to move closer to the valve body 1. There is interposed between the lower surface of the cover plate and the upper surface of the body 1 a washer of synthetic rubber or other acid resisting resilient material. This washer at its outer edge is cut to the shape of the upper end of the valve body 1 but at its inner edge is cut to a circular shape, the diameter of which is considerably less than the diameter of the recess 23 so as to permit an appreciable portion 42 to hang over the inner edge of the body within the recess 23.

The cover plate 35 is provided with a round opening 43 of approximately the same diameter as the counterbored recess 23 or slightly less so as to leave an annular space between the stem portion 27 and the inner surface of the plate at the upper end of the body 1. A ring 44 of graphite, plastic or any other acid-resisting material is fitted loosely about the stem portion 27 and sits on the shoulder 29 of the plug. The thickness of the ring 44 as measured radially is somewhat less than the width of the annular opening between the cover plate and the stem 27 so as to leave a space sufficient to accommodate the downward-extending overhanging portion of the washer 41. The latter is thereby caused to press against the outer surface of the ring 44. Downward pressure on the ring is exerted by means of a hollow gland member 45 having an inwardly projecting portion 46 which fits slidably about the stem 28. The gland is cut out at its interior as indicated at 47 so as to lighten this member as much as possible and to prevent undue friction at the surface of the stem 28. Thus by applying pressure to the gland 45 in a manner as will be explained hereinafter, the graphite ring 44 is caused to bear tightly but without excessive friction against the upper surface of the plug proper, i. e. surface 29, and by tightening the nuts 40 the inner portion of the washer 41 is caused tightly to press against the exterior surface of the ring 44. In order to increase the pressure between the washer and the ring, the inner edge of the washer may be tapered or chamfered as indicated at 48 so that any lubricant under pressure which might have leaked upwardly past the groove 34 and into the annular space 23 will also tend to press the inner portion of the washer against the sealing ring. It has already been pointed out that pressure is applied to the lubricant in the bore or reservoir 18 by tightening the screw 22 and thus pressure is transmitted hydrostatically throughout the inter-connected grooves and over the entire length of the plug 25.

In order to apply a predetermined but resilient pressure against the gland member 45, the latter may be provided with a pair of oppositely positioned counterbored recesses, these recesses being positioned at opposite ends of the member. Openings 50 extend through the cover plate at each of these recesses for loosely receiving respectively the shanks of bolts 51 which are threaded at the lower end into the cover plate 35. The upper ends of the bolts are provided with nuts 52 and there is a compression spring 53 contained within each recess 49 and surrounding its bolt. The size of each nut 52 is less than the diameter of the recess so that as the nut is tightened a downward thrust of flexible character is applied to the gland 46 to hold the sealing ring 44 in place.

The upper end of the stem portion 28 may be provided with a hexagonal countersunk opening for receiving the head of a wrench by which the plug 25 may be turned between the valve on and off positions. Due to the fact that the ring 44 is constituted preferably of graphite, its lubricating properties tend to eliminate any friction between the ring and the plug or its stem during operation of the valve so that very little wear is encountered and the ring therefore has relatively long life. Any slight leakage of lubricant into the recess 23 at the lower seat of the washer 41 tends to maintain the latter in a pliable condition so that often this member requires little or no replacement during the life of the valve. Yet a tight seal is provided at the top of the valve body by which to restrain the slightest leakage of fluid even under high pressures upwardly out of the valve since any pressure may be exerted on the ring 44 by simply tightening the nuts 52.

It is apparent that the screw plug 20 may be removed when it is desired to flush out the reservoir 18 which in time serves to collect the drainage oil as well as a supply reservoir for lubricant which is forced by pressure through the various grooves 33 and 34 and thence on to the valve seat 24.

While the structural arrangement of the apparatus disclosed and described herein constitutes a preferred form of the invention, it is to be understood that the apparatus is capable of alteration without departing from the spirit of the invention, and that all modifications that fall within the scope of the appended claims are intended to be included herein.

Having thus fully described my invention, what I claim as new and desire to secure by Letters Patent, is:

1. A valve for controlling the flow of fluid through a coupling, said coupling being provided with a main passageway and an angularly positioned bore communicating therewith, a valve plug within said bore adapted to rotate, said bore terminating in a recess immediately above the plug, a cover plate for the valve, and a washer of flexible material interposed between the cover plate and the top surface of the valve, said washer extending into said recess, and a sealing ring interposed between the inner edge of said washer and the plug.

2. A valve for controlling the flow of fluid through a coupling, said coupling including a valve body provided with a main passageway and an angularly positioned bore communicating therewith, a valve plug within said bore adapted to rotate, said valve body extending for a distance beyond the upper surface of the plug, said plug being provided with a shoulder portion to form a stem positioned directly opposite the upper surface of the valve body, an annular space between said upper surface and said stem, a sealing ring surrounding said stem and resting on said shoulder, a flexible washer supported on the upper surface of said valve body and projecting inwardly to press against the outer surface of said ring and means for applying pressure to each of said washer and said sealing ring.

3. A valve for controlling the flow of fluid through a coupling, said coupling including a valve body provided with a main passageway and an angularly positioned bore communicating therewith, a valve plug within said bore adapted to rotate, said valve body extending for a distance beyond the upper surface of the plug, said plug being provided with a shoulder portion to form a stem positioned directly opposite the upper surface of the valve body, an annular space between said upper surface and said stem, a sealing ring of non-flexible and self-lubricating material surrounding said stem and resting on said shoulder, a flexible washer supported on the upper surface of said valve body and projecting inwardly to press against the outer surface of said ring and means for applying pressure to each of said washer and said sealing ring.

4. A valve for controlling the flow of fluid through a coupling, said coupling including a valve body provided with a main passageway and an angularly positioned bore communicating therewith, a valve plug within said bore adapted to rotate, said valve body extending for a distance beyond the upper surface of the plug, said plug being provided with a shoulder portion to form a stem positioned directly opposite the upper surface of the valve body, an annular space between said upper surface and said stem, a sealing ring of non-flexible and self-lubricating material surrounding said stem and resting on said shoulder, a flexible washer supported on the upper surface of said valve body and projecting inwardly to press against the outer surface of said ring, a first gland ring clamped to said body and compressing the periphery of said washer, and a second gland ring resiliently secured to said first gland ring and compressing said sealing ring.

OYSTEIN JACOBSEN.

REFERENCES CITED

The following references are of record in the file of this patent:

UNITED STATES PATENTS

| Number | Name | Date |
| --- | --- | --- |
| Re. 19,068 | Martin | Jan. 30, 1934 |
| 826,536 | Butterfield | July 24, 1906 |
| 1,992,738 | Carpenter | Feb. 26, 1935 |
| 2,058,747 | Wilkins | Oct. 27, 1936 |
| 2,090,743 | Bard | Aug. 24, 1937 |
| 2,231,690 | Sheldrick | Feb. 11, 1941 |
| 2,272,526 | Keeran | Feb. 10, 1942 |
| 2,287,207 | Vedovell | June 23, 1942 |

FOREIGN PATENTS

| Number | Country | Date |
| --- | --- | --- |
| 17,397 | Great Britain | 1894 |